United States Patent
Kim et al.

(10) Patent No.: US 11,639,175 B2
(45) Date of Patent: May 2, 2023

(54) METHOD OF CONTROLLING VEHICLE WHEN VEHICLE PASSES OVER SPEED BUMP

(71) Applicants: Hyundai Motor Company, Seoul (KR); Kia Corporation, Seoul (KR)

(72) Inventors: In-Su Kim, Anyang-Si (KR); Myung-Ki Yeom, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 235 days.

(21) Appl. No.: 17/229,658

(22) Filed: Apr. 13, 2021

(65) Prior Publication Data
US 2022/0185283 A1 Jun. 16, 2022

(30) Foreign Application Priority Data
Dec. 14, 2020 (KR) .................. 10-2020-0174271

(51) Int. Cl.
*B60W 30/18* (2012.01)
*B60W 10/22* (2006.01)
(Continued)

(52) U.S. Cl.
CPC ... *B60W 30/18009* (2013.01); *B60G 17/0165* (2013.01); *B60W 10/04* (2013.01);
(Continued)

(58) Field of Classification Search
CPC .......... B60W 30/18009; B60W 10/04; B60W 10/18; B60W 10/22; B60W 2520/10;
(Continued)

(56) References Cited

U.S. PATENT DOCUMENTS

2007/0050110 A1* 3/2007 Kondoh .............. B60W 30/146
701/1
2007/0067080 A1* 3/2007 Messih .................. B60T 8/172
701/41
(Continued)

FOREIGN PATENT DOCUMENTS

DE    102019111321 A1 * 11/2019 ......... B60G 17/0165
KR    10-2012-0051552 A      5/2012
(Continued)

*Primary Examiner* — B M M Hannan
(74) *Attorney, Agent, or Firm* — Morgan, Lewis & Bockius LLP

(57) ABSTRACT

A method of controlling a vehicle when the vehicle passes over a speed bump, may include: dividing sections of the road into a first section within a first time period before the front wheel of the vehicle collides with the speed bump, a second section while the front wheel collides with the speed bump, a third section within a second time period before the rear wheel collides with the speed bump, and a fourth section while the rear wheel collides with the speed bump; and controlling and distributing at least one of suspension damping force, driving power and braking force to the front wheel and the rear wheel for each of the first section, the second section, the third section and the fourth section to reduce the amount of impact to be applied when the vehicle collides with the speed bump and to reduce a vertical motion of the vehicle that occurs while the vehicle goes over the speed bump.

20 Claims, 4 Drawing Sheets

(51) Int. Cl.
*B60W 10/04* (2006.01)
*B60W 10/18* (2012.01)
*B60G 17/0165* (2006.01)

(52) U.S. Cl.
CPC ............ *B60W 10/18* (2013.01); *B60W 10/22* (2013.01); *B60G 2400/204* (2013.01); *B60G 2400/82* (2013.01); *B60G 2500/10* (2013.01); *B60W 2520/10* (2013.01); *B60W 2520/16* (2013.01); *B60W 2552/35* (2020.02); *B60W 2710/182* (2013.01); *B60W 2710/226* (2013.01); *B60W 2720/16* (2013.01)

(58) Field of Classification Search
CPC ......... B60W 2520/16; B60W 2552/35; B60W 2710/182; B60W 2710/226; B60W 2720/16; B60W 10/184; B60W 30/085; B60W 30/0956; B60W 30/146; B60W 60/0013; B60W 2520/105; B60W 2554/60; B60W 2720/10; B60W 2720/403; B60W 40/06; B60G 17/0165; B60G 2400/204; B60G 2400/82; B60G 2500/10; B60G 2400/0512; B60G 2400/102; B60G 2400/821; B60G 2400/823; B60G 2401/142; B60G 2401/174; B60G 2401/21; B60G 2800/014; B60G 17/0195; B60G 17/018
USPC .......................................................... 701/38
See application file for complete search history.

(56) References Cited

U.S. PATENT DOCUMENTS

| | | | |
|---|---|---|---|
| 2008/0234896 A1* | 9/2008 | Kato | B60G 17/06 701/37 |
| 2013/0184955 A1* | 7/2013 | Kobayashi | B60T 8/1764 701/72 |
| 2013/0245888 A1* | 9/2013 | Kikuchi | B60G 17/06 701/38 |
| 2013/0345933 A1* | 12/2013 | Norton | B60G 17/08 701/37 |
| 2014/0019027 A1* | 1/2014 | Kojima | B60L 50/16 701/102 |
| 2015/0291177 A1* | 10/2015 | Lee | B60W 40/06 73/146 |
| 2017/0246955 A1* | 8/2017 | Richards | B60T 8/86 |
| 2019/0001965 A1* | 1/2019 | Cho | B60W 10/06 |
| 2020/0346654 A1* | 11/2020 | Kojo | G01C 21/3822 |
| 2021/0162832 A1* | 6/2021 | Hwang | B60G 17/06 |
| 2021/0179112 A1* | 6/2021 | Tanimichi | B60W 40/105 |
| 2022/0185283 A1* | 6/2022 | Kim | B60W 10/184 |
| 2022/0332306 A1* | 10/2022 | Noma | B62D 6/04 |

FOREIGN PATENT DOCUMENTS

| | | |
|---|---|---|
| KR | 102197681 B1 * | 5/2016 |
| KR | 10-2042364 B1 | 11/2019 |

* cited by examiner

METHOD OF CONTROLLING VEHICLE WHEN VEHICLE PASSES OVER SPEED BUMP

CROSS-REFERENCE TO RELATED APPLICATIONS

The present application claims priority to Korean Patent Application No. 10-2020-0174271, filed on Dec. 14, 2020, in the Korean Intellectual Property Office, the entire contents of which is incorporated herein for all purposes by this reference.

BACKGROUND OF THE INVENTION

Field of the Invention

The present invention relates to a method of controlling a vehicle when the vehicle passes over a speed bump, and more particularly, to a method capable of reducing the amount of impact to be applied to a vehicle and reducing a motion of the vehicle while the vehicle passes over a speed bump.

Description of Related Art

An autonomous vehicle refers to a vehicle that determines a risk by recognizing a traveling environment, minimizes a driver's driving operation by planning a traveling route, and autonomously travels safely without being directly manipulated by the driver. Since the autonomous vehicle autonomously travels, an occupant in the vehicle may assume various postures to perform personal tasks or take a rest.

Meanwhile, the autonomous vehicle may pass over a speed bump provided on a road while the autonomous vehicle travels. In the instant case, a vertical motion (nose-up or nose-down) of the vehicle may occur as the vehicle collides with the speed bump or goes over the speed bump. Because of the present situation, the occupant in the vehicle may feel uncomfortable or a safety accident may occur to the occupant in a severe case.

To solve the above-mentioned problems, there is included a technology configured for controlling a vehicle when the vehicle passes over a speed bump.

(Patent Document 1) Korean Patent No. 10-2042364 (SYSTEM FOR CONTROLLING VEHICLE AND DETECTING SPEED BUMP) includes that a vehicle may detect in advance a speed bump and smoothly go over the speed bump by automatically controlling a speed before the vehicle reaches the speed bump.

(Patent Document 2) Korean Patent Application Laid-Open No. 10-2012-0051552 (SYSTEM FOR CONTROLLING VEHICLE AND DETECTING SPEED BUMP) includes that the system determines a distance between a vehicle and a speed bump when the vehicle detects the speed bump, the system determines a point in time at which the vehicle will reach the speed bump, and then the system controls and operates a suspension system before the vehicle reaches the speed bump.

The patent documents are intended to reduce the amount of impact to be applied to the vehicle when the vehicle collides with the speed bump, but the patent documents do not propose a solution for reducing the vertical motion of the vehicle caused by the nose-up or the nose-down that occurs when the vehicle goes over the speed bump.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an invention that divides sections in which front and rear wheels of a vehicle pass over a speed bump, reducing both the amount of impact to be applied to the vehicle and a vertical motion of the vehicle in each of the sections.

Various aspects of the present invention are directed to providing a method of controlling a vehicle when the vehicle passes over a speed bump, in which the method controls the vehicle while a front wheel and a rear wheel of the vehicle sequentially pass over the speed bump, the method including: dividing sections of the road into a first section within a first time period before the front wheel of the vehicle collides with the speed bump, a second section while the front wheel collides with the speed bump, a third section within a second time period before the rear wheel collides with the speed bump, and a fourth section while the rear wheel collides with the speed bump; and controlling and distributing at least one of suspension damping force, driving power and braking force to the front wheel and the rear wheel for each of the first section, the second section, the third section and the fourth section to reduce the amount of impact to be applied when the vehicle collides with the speed bump and to reduce a vertical motion of the vehicle that occurs while the vehicle goes over the speed bump.

According to various exemplary embodiments of the present invention, the sections, in which the front wheel and the rear wheel of the vehicle pass over the speed bump when the vehicle passes over the speed bump, are divided, and the distribution control of the suspension damping force and the driving power/braking force to the front wheel and the rear wheel is performed for each of the sections such that both the amount of impact to be applied to the vehicle and the vertical motion of the vehicle may be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
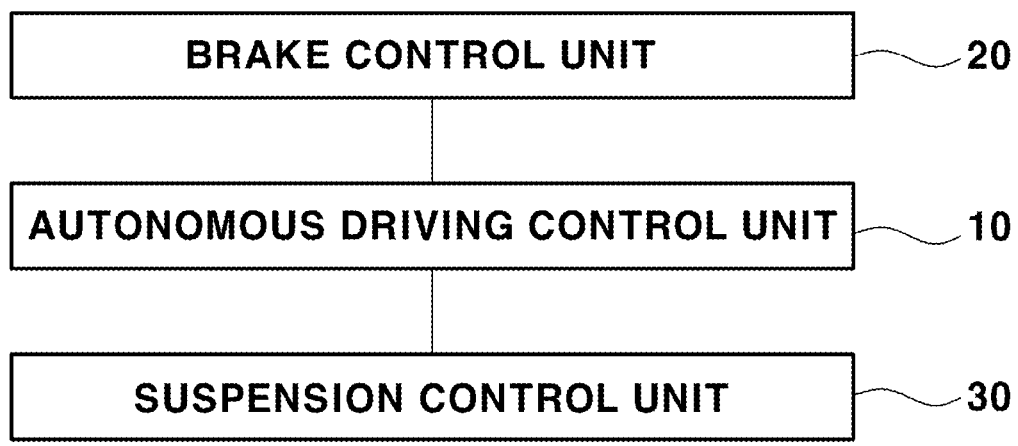
FIG. 1 is a view exemplarily illustrating a configuration for implementing a method of controlling a vehicle when the vehicle passes over a speed bump according to the exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, various exemplary embodiments of a method of controlling a vehicle when the vehicle passes over a speed bump according to various exemplary embodiments of the present invention will be described in detail with reference to the drawings. Terms or words used herein should not be interpreted as being limited to general or dictionary meanings and should be interpreted as meanings and concepts which conform to the technical spirit of the present invention based on a principle that an inventor can appropriately define a concept of a term to describe his/her own invention by the best method.

The present invention relates to a method of controlling the vehicle when the vehicle passes over the speed bump. In the instant case, types of vehicles are not limited, but in the exemplary embodiment, the description will be made focusing on an autonomous vehicle. The autonomous vehicle may travel in an autonomous driving mode in which the autonomous vehicle travels regardless of a driver's intention or in a manual driving mode in which the vehicle travels based on the driver's intention.

FIG. 1 is a view exemplarily illustrating a control apparatus and configuration thereof for implementing a method of controlling a vehicle when the vehicle passes over a speed bump according to the exemplary embodiment of the present invention.

Referring to FIG. 1, the method of controlling the vehicle when the vehicle passes over the speed bump according to the exemplary embodiment of the present invention includes an autonomous driving control unit 10, a brake control unit 20, and a suspension control unit 30.

The autonomous driving control unit 10 detects and processes internal and external information collected by various types of sensors mounted in the vehicle, identifies a surrounding environment, autonomously determines a target traveling route, and allows the vehicle to travel even though a driver does not control a brake pedal, a steering wheel, an accelerator pedal, and the like. The autonomous driving control unit 10 is connected to the brake control unit 20 and the ECS control unit 30 so that a brake system and a suspension system may be cooperatively controlled while the vehicle collides with the speed bump.

The autonomous driving control unit 10 is connected to various sensors, such as a camera, a radar sensor, a Light Detection and Ranging (LiDAR) sensor, or an acceleration sensor, configured for acquiring external information. The camera, the radar sensor, or the LiDAR sensor measures a height and a width of the speed bump located in front of the vehicle and measures a distance between the vehicle and the speed bump, and the autonomous driving control unit 10 receives the measured information, determining respective values. The acceleration sensor measures a motion of the vehicle, and the autonomous driving control unit 10 receives the measured information, determining whether the current state of the vehicle is a nose-up state or a nose-down state, and determining a degree of pitching.

The brake control unit 20 controls brake actuators. The brake control unit 20 generates hydraulic braking pressure in accordance with a request of the autonomous driving control unit 10 or a pedal effort applied to the brake pedal by the driver, and generates control signals to be transmitted to the brake actuators mounted on respective wheels.

The brake control unit 20 is connected to various sensors such as a wheel speed sensor, sensors for detecting operation angles of the accelerator pedal and the brake pedal, and a hydraulic braking pressure sensor. The wheel speed sensor is mounted on each of the wheels and detects a speed of the vehicle. The sensors for detecting operation angles of the accelerator pedal and the brake pedal detect degrees of pedal efforts applied to the accelerator pedal and the brake pedal by the driver. The hydraulic braking pressure sensor detects a magnitude of hydraulic braking pressure generated based on the control signal from the brake control unit 20.

The suspension control unit 30 is a control unit of an electronic control suspension system (ECS). The ECS controls a height of the vehicle or a posture of a vehicle body by changing a spring constant, damping force of a shock absorber, a circuit pressure of an air spring, and the like in accordance with a traveling speed and a road condition of the vehicle, improving both traveling stability and ride quality. The suspension control unit 30 applies a control signal to the shock absorber mounted on each of the wheels in accordance with a command from the autonomous driving control unit 10.

Figure 2:
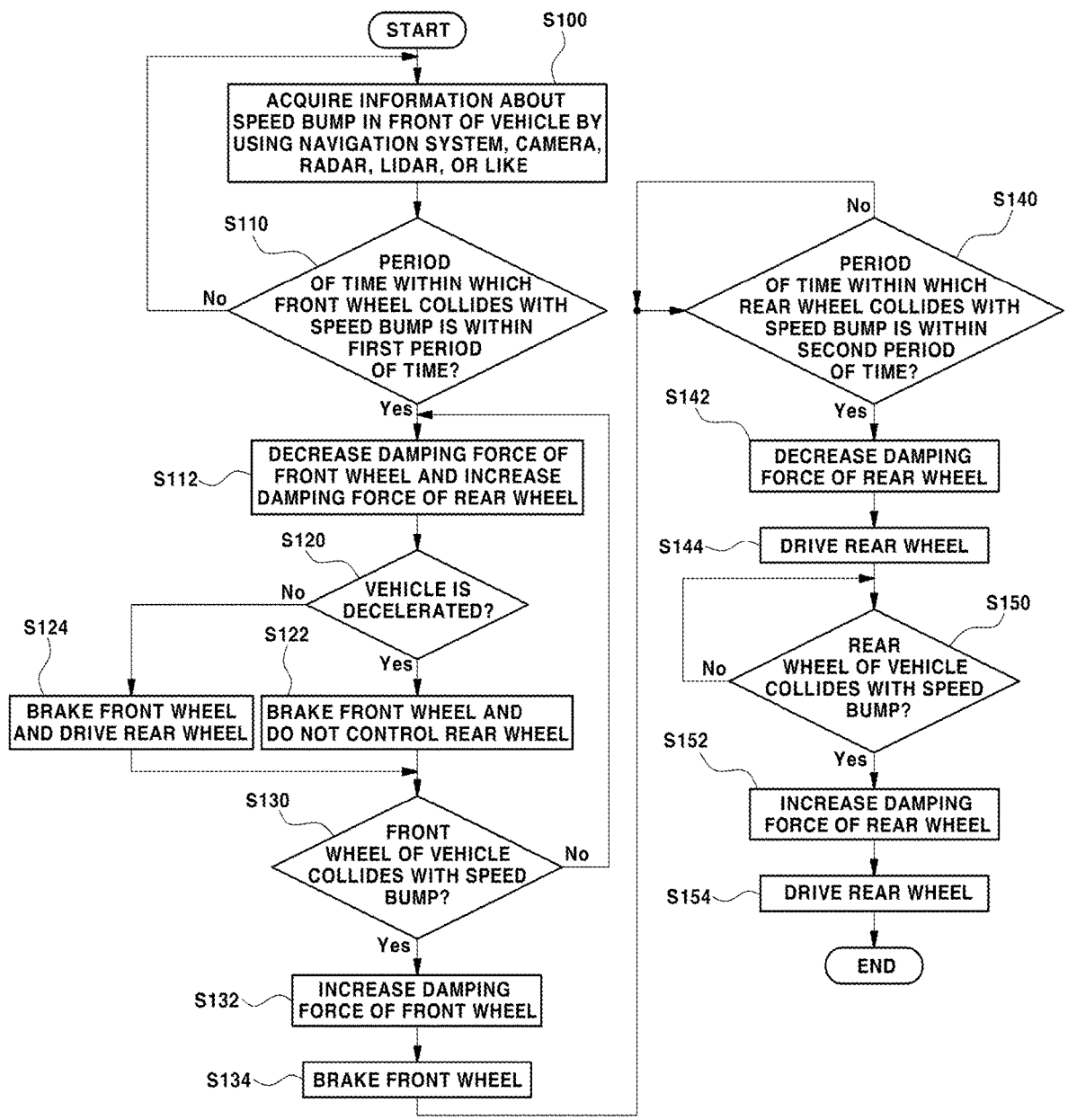
FIG. 2 is a flowchart illustrating the method of controlling the vehicle when the vehicle passes over the speed bump according to the exemplary embodiment of the present invention.

FIG. 2 is a flowchart illustrating the method of controlling the vehicle when the vehicle passes over the speed bump according to the exemplary embodiment of the present invention.

Hereinafter, the method of controlling the vehicle when the vehicle passes over the speed bump according to the exemplary embodiment of the present invention will be described with reference to FIG. 2.

The method of controlling the vehicle when the vehicle passes over the speed bump according to the exemplary embodiment of the present invention controls both the amount of impact to be applied to the vehicle and the motion of the vehicle while the vehicle passes over the speed bump. A front wheel and a rear wheel of the vehicle sequentially pass over the speed bump. In the instant case, the sections in which the vehicle passes over the speed bump are broadly divided into first to fourth sections. The first section is a section for a first time period before the front wheel of the vehicle collides with the speed bump. The second section is a section while the front wheel of the vehicle collides with the speed bump. The third section is a section for a second time period before the rear wheel collides with the speed bump. The fourth section is a section while the rear wheel collides with the speed bump. The present invention has been made to reduce the amount of impact which may occur in each of the sections, and to control and reduce a vertical motion of the vehicle caused by nose-up or nose-down.

As illustrated in FIG. 2, the autonomous driving control unit 10 identifies a speed bump positioned in front of the vehicle by use of the camera, the radar, the LiDAR, or the navigation system, and collects information related to the speed bump (S100).

Figure 3:
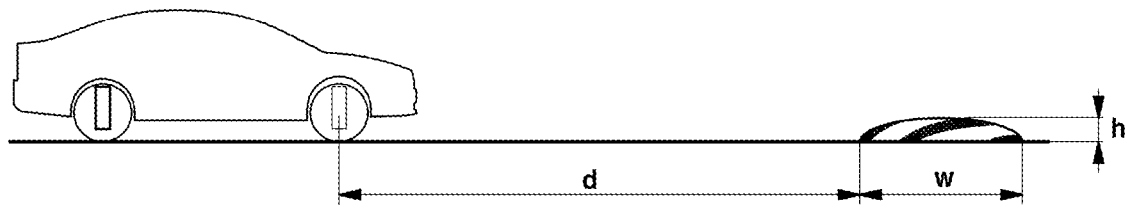
FIG. 3 is a view exemplarily illustrating a state in which information related to the speed bump is acquired in accordance with the exemplary embodiment of the present invention.

FIG. 3 is a view exemplarily illustrating a state in which information related to the speed bump is acquired in accordance with the exemplary embodiment of the present invention.

Referring to FIG. 3, the information related to the speed bump includes a distance (d) between the vehicle and the speed bump and an area (w) and a height (h) of the speed bump. The information is acquired by monitoring, in real time, the speed bump by use of the camera, the radar, the LiDAR, or the navigation system mounted in the vehicle. In the instant case, the autonomous driving control unit 10 determines a time period (t) within which the vehicle collides with the speed bump by performing arithmetic operations on a current vehicle speed (v) and the distance (d) between the vehicle and the speed bump. In the instant case, the distance (d) between the vehicle and the speed bump is a distance between the front wheel of the vehicle and the speed bump.

Referring back to FIG. 2, the autonomous driving control unit 10 determines whether the time period within which the front wheel of the vehicle collides with the speed bump is within a first time period (S110). This is to determine whether the vehicle is currently positioned in the first section. In the instant case, the first time period may be variously set. However, in the exemplary embodiment of the present invention, the first time period is about 3 seconds.

When the time period within which the front wheel of the vehicle collides with the speed bump is within the first time period, the autonomous driving control unit 10 controls and distributes suspension damping force and driving power/braking force to the front wheel and the rear wheel.

Figure 4:
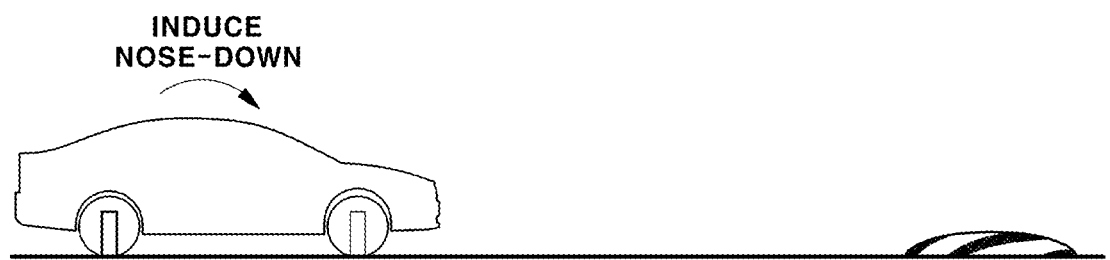
FIG. 4 is a view exemplarily illustrating a state in which the vehicle is controlled in a first section according to the exemplary embodiment of the present invention.

FIG. 4 is a view exemplarily illustrating a state in which the vehicle is controlled in the first section according to the exemplary embodiment of the present invention.

When the front wheel of the vehicle collides with the speed bump, not only impact is applied to the vehicle, but also the vehicle undergoes nose-up. Therefore, it is necessary to control and reduce the amount of impact and the occurrence of the nose-up before the front wheel of the vehicle collides with the speed bump.

Referring to FIGS. 2 and 4, in the first section, the autonomous driving control unit 10 applies a control signal to the suspension control unit 30 to reduce the amount of impact, which occurs as the front wheel collides with the speed bump after the first section, by decreasing damping force of the front wheel and increasing damping force of the rear wheel (S112). This control also has an effect of reducing the nose-up of the vehicle after the first section. The decrease in damping force of the front wheel is for reducing the amount of impact to be applied when the front wheel collides with the speed bump. The increase in damping force of the rear wheel is for reducing the nose-up by preventing a spring of the rear wheel from being compressed by the nose-up of the vehicle. Damping values of the front wheel and the rear wheel may be determined based on values stored in a memory by tuning or based on a predetermined formula. Meanwhile, in the exemplary embodiment of the present invention, a decrement of the damping force of the front wheel and an increment of the damping force of the rear wheel are increased as a height and a width of the speed bump are increased.

Meanwhile, to further reduce the nose-up occurring after the first section, the autonomous driving control unit 10 further performs the distribution control of the driving power/braking force in the first section. That is, the autonomous driving control unit 10 performs the distribution control of the driving power/braking force to induce the nose-down of the vehicle in the first section. To induce the nose-down, the autonomous driving control unit 10 applies a control signal to the brake control unit 20 to distribute braking force only to the front wheel. In the instant case, the autonomous driving control unit 10 may decrease the vehicle speed by not controlling the rear wheel and may control and distribute driving power to the rear wheel to restrict the vehicle speed to a predetermined speed. To prevent a collision between a bottom portion of the vehicle and the speed bump caused by the nose-down, the autonomous driving control unit 10 determines a degree of pitching, which occurs due to the nose-down, by considering the height or the width of the speed bump.

Meanwhile, the induction of the nose-down may be controlled only by the distribution of the braking force to the front wheel. However, the vehicle may pass over the speed bump while decelerating or the vehicle may pass over the speed bump while maintaining the vehicle speed. In the instant case, referring to FIG. 2, the autonomous driving control unit 10 determines whether the vehicle is decelerated in the first section (S120). The autonomous driving control unit 10 does not control the rear wheel when the vehicle is decelerated (S122), and the autonomous driving control unit 10 controls and distributes the driving power to the rear wheel when the vehicle is not decelerated (S124).

Figure 5:
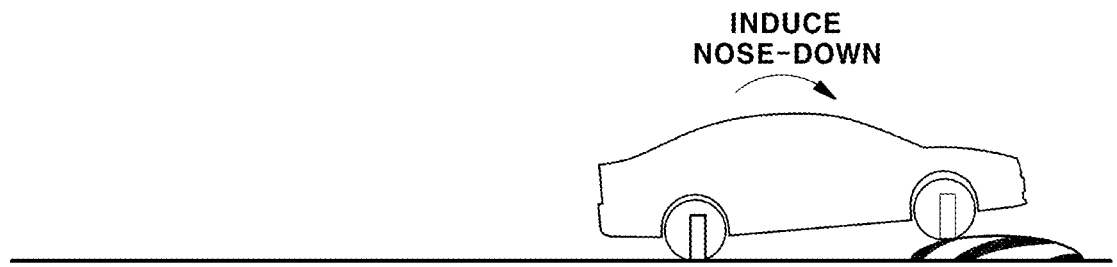
FIG. 5 is a view exemplarily illustrating a state in which the vehicle is controlled in a second section according to the exemplary embodiment of the present invention.

FIG. 5 is a view exemplarily illustrating a state in which the vehicle is controlled in the second section according to the exemplary embodiment of the present invention.

Referring to FIG. 2, the autonomous driving control unit 10 determines whether the front wheel of the vehicle collides with the speed bump (S130). This is to determine whether the vehicle is currently positioned in the second section.

In the first section, the autonomous driving control unit 10 controls and reduces the nose-up of the vehicle, but the nose-up occurs while the front wheel of the vehicle passes over the speed bump. Therefore, it is necessary to control and reduce the occurrence of the nose-up while the front wheel of the vehicle collides with the speed bump.

Referring to FIGS. 2 and 5, the autonomous driving control unit 10 applies a control signal to the suspension control unit 30 to reduce the nose-up by increasing the damping force of the front wheel in the second section (S132). In the instant case, the damping force of the rear wheel may be kept increased in the first section.

Meanwhile, to further reduce the nose-up occurring in the second section, the autonomous driving control unit 10 further performs the distribution control of the driving power/braking force. That is, the autonomous driving control unit 10 performs the distribution control of the driving power/braking force to induce the nose-down of the vehicle in the second section. The method of inducing the nose-down is identical to the described method performed in the first section. Therefore, the autonomous driving control unit 10 controls and distributes the braking force to the front wheel (S134).

Referring to FIG. 2, the autonomous driving control unit 10 determines whether the time period within which the rear wheel of the vehicle collides with the speed bump is within a second time period (S140). This is to determine whether the vehicle is currently positioned in the third section. In the instant case, the second time period may be variously set. However, in the exemplary embodiment of the present invention, the second time period is about 1 second.

When the time period within which the rear wheel of the vehicle collides with the speed bump is within the second time period, the autonomous driving control unit 10 controls and distributes at least one of suspension damping force, driving power and braking force to the front wheel and the rear wheel.

Figure 6:
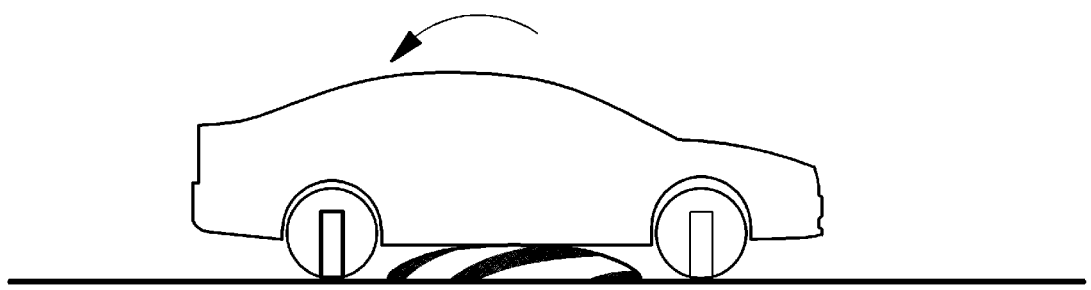
FIG. 6 is a view exemplarily illustrating a state in which the vehicle is controlled in a third section according to the exemplary embodiment of the present invention.

FIG. 6 is a view exemplarily illustrating a state in which the vehicle is controlled in the third section according to the exemplary embodiment of the present invention.

When the rear wheel of the vehicle collides with the speed bump, not only impact is applied to the vehicle, but also the vehicle undergoes nose-down. Therefore, it is necessary to control and reduce the amount of impact and the occurrence of the nose-down before the rear wheel of the vehicle collides with the speed bump.

Referring to FIGS. 2 and 6, the autonomous driving control unit 10 applies a control signal to the suspension control unit 30 to reduce the amount of impact, which occurs as the rear wheel collides with the speed bump after the third section, by decreasing the damping force of the rear wheel in the third section (S142). In the instant case, the damping force of the front wheel may be kept increased in the second section.

Meanwhile, to further reduce the nose-down occurring after the third section, the autonomous driving control unit 10 further controls the distribution control of the driving power/braking force in the third section. That is, the autonomous driving control unit 10 performs the distribution control of the driving power/braking force to induce the nose-up of the vehicle in the third section. To induce the nose-up, the autonomous driving control unit 10 applies a control signal to distribute driving power to the rear wheel (S144). In the instant case, the front wheel may not be controlled.

Figure 7:
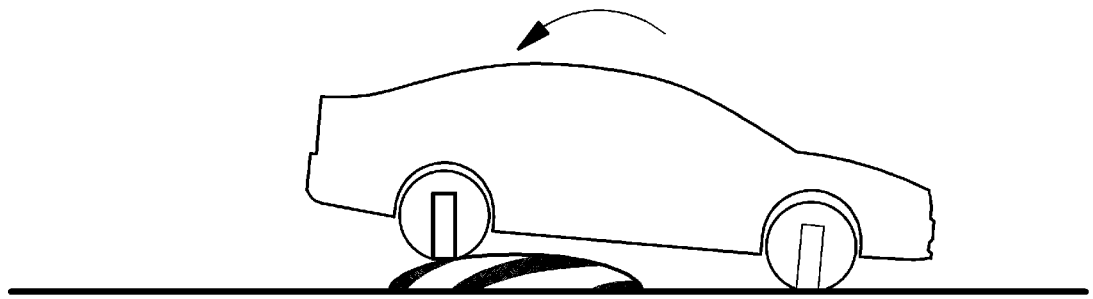
FIG. 7 is a view exemplarily illustrating a state in which the vehicle is controlled in a fourth section according to the exemplary embodiment of the present invention.

FIG. 7 is a view exemplarily illustrating a state in which the vehicle is controlled in the fourth section according to the exemplary embodiment of the present invention.

Referring to FIG. 2, the autonomous driving control unit 10 determines whether the rear wheel of the vehicle collides with the speed bump (S150). This is to determine whether the vehicle is currently positioned in the fourth section.

In the third section, the autonomous driving control unit 10 controls and reduces the nose-down of the vehicle, but the nose-down occurs while the rear wheel of the vehicle passes over the speed bump. Therefore, it is necessary to control and reduce the occurrence of the nose-down while the rear wheel of the vehicle collides with the speed bump.

Referring to FIGS. 2 and 7, the autonomous driving control unit 10 applies a control signal to the suspension control unit 30 to reduce the nose-down by increasing the damping force of the rear wheel in the fourth section (S152). In the instant case, the damping force of the front wheel may be kept increased in the second and third sections.

Meanwhile, to further reduce the nose-down occurring in the fourth section, the autonomous driving control unit 10 further performs the distribution control of the driving power/braking force. That is, the autonomous driving control unit 10 performs the distribution control of the driving power/braking force to induce the nose-up of the vehicle in the fourth section. The method of inducing the nose-up is identical to the described method performed in the third section. To induce the nose-up, the autonomous driving control unit 10 applies a control signal to distribute driving power to the rear wheel (S154). In the instant case, the front wheel may not be controlled.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a vehicle when the vehicle passes over a speed bump provided on a road, wherein the method controls the vehicle while a first wheel and a second wheel of the vehicle sequentially pass over the speed bump, the method comprising:
   dividing, by a controller, the road into a first section within a first time period before the first wheel of the vehicle collides with the speed bump, a second section while the first wheel collides with the speed bump, a third section within a second time period before the second wheel collides with the speed bump, and a fourth section while the second wheel collides with the speed bump; and
   controlling and distributing, by the controller, at least one of suspension damping force, driving power and braking force to the first wheel and the second wheel for each of the first section, the second section, the third section and the fourth section to reduce an amount of impact to be applied to the vehicle upon determining that the vehicle collides with the speed bump and to reduce a vertical motion of the vehicle that occurs while the vehicle goes over the speed bump,
   wherein the first section, the second section, the third section, and the fourth section are aligned in sequence in a moving direction of the vehicle.

2. The method of claim 1, further including:
   performing, by the controller, control of a suspension control unit to decrease the suspension damping force of the first wheel and to increase the suspension damping force of the second wheel to reduce the amount of impact to be applied to the vehicle in the first section.

3. The method of claim 2, further including:
   controlling, by the controller, a brake control unit connected to the controller to distribute the braking force only to the first wheel; and
   controlling, by the controller, the driving power to the second wheel to restrict a vehicle speed to a predetermined speed.

4. The method of claim 1, further including:
   performing, by the controller, control of a brake control unit to distribute the braking force to the first wheel to induce nose-down of the vehicle in the first section.

5. The method of claim 4, further including:
   determining, by the controller, whether the vehicle is decelerated in the first section;
   upon determining that the vehicle is not decelerated in the first section, braking, by the controller, the first wheel and distributing, by the controller, the driving power to the second wheel; and
   upon determining that the vehicle is decelerated in the first section, braking, by the controller, the first wheel and not controlling, by the controller, the second wheel.

6. The method of claim 4, further including:
   adjusting, by the controller, an amount of nose-down of the vehicle to prevent a collision between a bottom portion of the vehicle and the speed bump in the first section.

7. The method of claim 4, further including:
   performing, by the controller, control to distribute the driving power to the second wheel in the first section upon determining that the vehicle passes over the speed bump at a constant speed.

8. The method of claim 1, further including:
   performing, by the controller, control of a suspension control unit to increase the suspension damping force of the first wheel to reduce a vertical motion of the vehicle in the second section.

9. The method of claim 1, further including:
   performing, by the controller, control to distribute the driving power to the second wheel to induce nose-down of the vehicle in the second section.

10. The method of claim 1, further including:
    performing, by the controller, control of the suspension control unit to decrease the suspension damping force of the second wheel to reduce the amount of impact to be applied to the vehicle in the third section.

11. The method of claim 1, further including:
    performing, by the controller, control to distribute the driving power to the second wheel to induce nose-up of the vehicle in the third section.

12. The method of claim 1, further including:
    performing, by the controller, control of the suspension control unit to increase the suspension damping force of the second wheel to reduce a vertical motion of the vehicle in the fourth section.

13. The method of claim 1, further including:
    performing, by the controller, control to distribute the driving power to the second wheel to induce nose-down of the vehicle in the fourth section.

14. A control apparatus of controlling a vehicle when the vehicle passes over a speed bump provided on a road, wherein the control apparatus controls the vehicle while a first wheel and a second wheel of the vehicle sequentially pass over the speed bump, the control apparatus comprising:
    a brake control unit;
    a suspension control unit; and
    a driving controller including a processor and connected to the brake control unit and the suspension control unit, wherein the driving controller is configured for:
       dividing the road into a first section within a first period before the first wheel of the vehicle collides with the speed bump, a second section while the first wheel collides with the speed bump, a third section within a second time period before the second wheel collides with the speed bump, and a fourth section while the second wheel collides with the speed bump; and controlling and distributing at least one of suspension damping force, driving power and braking force to the first wheel and the second wheel for each of the first section, the second section, the third section and the fourth section to reduce an amount of impact to be applied to the vehicle upon determining that the vehicle collides with the speed bump and to reduce a vertical motion of the vehicle that occurs while the vehicle goes over the speed bump, wherein the first section, the second section, the third section, and the fourth section are aligned in sequence in a moving direction of the vehicle.

15. The control apparatus of claim 14, wherein the driving controller is further configured for performing control of the suspension control unit to decrease the suspension damping force of the first wheel and to increase the suspension damping force of the second wheel to reduce the amount of impact to be applied to the vehicle in the first section.

16. The control apparatus of claim 14, wherein the driving controller is further configured for performing control of the brake control unit to distribute the braking force to the first wheel to induce nose-down of the vehicle in the first section.

17. The control apparatus of claim 16, wherein the driving controller is further configured for:

determining whether the vehicle is decelerated in the first section; and upon determining that the vehicle is not decelerated in the first section, braking the first wheel and distributing the driving power to the second wheel; and upon determining that the vehicle is decelerated in the first section, braking the first wheel and not controlling the second wheel.

18. The control apparatus of claim 14, wherein the driving controller is further configured for:

performing control of the suspension control unit to increase the suspension damping force of the first wheel to reduce a vertical motion of the vehicle in the second section; and/or performing control to distribute the driving power to the second wheel to induce nose-down of the vehicle in the second section.

19. The control apparatus of claim 14, wherein the driving controller is further configured for:

performing control of the suspension control unit to decrease the suspension damping force of the second wheel to reduce the amount of impact to be applied to the vehicle in the third section; and/or performing control to distribute the driving power to the second wheel to induce nose-up of the vehicle in the third section.

20. The control apparatus of claim 14, wherein the driving controller is further configured for:

performing control of the suspension control unit to increase the suspension damping force of the second wheel to reduce a vertical motion of the vehicle in the fourth section; and/or performing control to distribute the driving power to the second wheel to induce nose-down of the vehicle in the fourth section.

* * * * *